(12) United States Patent
Takinosawa

(10) Patent No.: US 6,977,960 B2
(45) Date of Patent: Dec. 20, 2005

(54) SELF TEST CIRCUIT FOR EVALUATING A HIGH-SPEED SERIAL INTERFACE

(75) Inventor: Jun Takinosawa, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 806 days.

(21) Appl. No.: 09/930,483

(22) Filed: Aug. 16, 2001

(65) Prior Publication Data

US 2003/0035473 A1 Feb. 20, 2003

(51) Int. Cl.[7] .......................................... H04B 17/00
(52) U.S. Cl. ................. 375/224; 375/221; 375/213; 375/220; 714/733; 714/724; 714/704
(58) Field of Search .................... 375/224, 221, 375/213, 220; 714/733, 738, 724, 716, 704

(56) References Cited

U.S. PATENT DOCUMENTS 5,802,073 A * 9/1998 Platt ........................... 714/733
6,201,829 B1 3/2001 Schneider .................... 375/221
6,298,458 B1 * 10/2001 Cranford et al. ............ 714/716
6,760,873 B1 * 7/2004 Hao et al. .................... 714/724
6,816,987 B1 * 11/2004 Olson et al. ................. 714/704
2004/0153931 A1 * 8/2004 Cao et al. .................... 714/738

* cited by examiner

Primary Examiner—Shuwang Liu
Assistant Examiner—Eva Zheng
(74) Attorney, Agent, or Firm—McDermott Will & Emery LLP

(57) ABSTRACT

A data transceiver including a self-test data generator for generating test data, which includes a first pseudo-random number generator programmable so as to allow the operator to input the test data values. The data transceiver further includes a transmitter section coupled to the self-test data generator, a receiver section coupled to the transmitter section, and a test data analyzer coupled to the receiver section, wherein the test data analyzer includes a second pseudo-random number generator, which allows the operator to input the data value via a data bus coupled to the test data analyzer. Both the self-test data generator and the test data analyzer are independently controllable.

27 Claims, 4 Drawing Sheets

SELF TEST CIRCUIT FOR EVALUATING A HIGH-SPEED SERIAL INTERFACE

FIELD OF THE INVENTION

The present invention relates to a method and device for performing self testing of a high-speed serial interface, and more particularly to a built-in test circuit for testing the operation of a high-speed serial interface utilized in the implementation of a universal serial bus (USB) system.

BACKGROUND OF THE INVENTION

The use of a Universal Serial Bus (USB) for coupling a peripheral device to a host computer/controller has become well known. Moreover, the maximum transmission rate of the USB is continually increasing. For example, while the USB 1.0 standard provided a transmission rate of 12 Mb/s, the USB 2.0 standard provides for a transmission rate of 480 Mb/s (a full 40×faster). As the speed of data transmission continually increases, it is becoming increasing important and difficult to accurately test the components responsible for transmitting and receiving the data (i.e., the data transceiver forming the USB interface). Moreover, due to the high speed of operation, it is typically necessary to test the transceiver under normal operating conditions in order to accurately evaluate the functionality of the transceiver.

In order to accomplish such testing and evaluation, typically, such high-speed circuits incorporate some form of a built-in test circuit, which is capable of performing a self-test on the transceiver while simulating normal operation conditions. Such built-in test circuits function to generate a test pattern which is input and routed through the transmitter portion of the transceiver operating at the normal operational data rate. The data routed through the transmitter portion is then routed to the receiver portion of the transceiver, and upon being processed by the receiver portion, the received data is compared with the known test pattern input into the transmitter portion. If the transceiver is operating correctly, the received data will match the test pattern input into the transmitter portion.

U.S. Pat. No. 6,201,829 illustrates a typical built-in test circuit utilized for testing the functionality of transceiver under normal operating conditions. Referring to FIG. 5 of the '829 patent, the self-test circuit includes a built-in self test (BIST) circuit 62, which functions to generate a test pattern. This test pattern is then coupled to the transmitter section formed by input latch 50, serializer 52 and output buffer 54. The output of buffer 54 is also coupled to the receiver section via multiplexer 55. The receiver section includes sampler 56, deserializer 58, output driver 60 and a BIST signal analyzer 61.

In order to conduct the self-test, a self-test signal is activated. This signal functions to control the multiplexer 35 such that the multiplexer selects the output of the BIST 62 as the input data to the transmitter section. The signal also controls multiplexer 55 such that the multiplexer selects the output of buffer 54 as the input data to the receiver section. When operating in the self-test mode, upon receipt of the incoming data, the BIST signal analyzer 61 compares the incoming data to determine if an error has occurred. It is noted that the BIST signal analyzer contains a data pattern identical to the one generated by the BIST circuit 62 so as to allow the BIST signal analyzer to perform the necessary comparison.

Notwithstanding the ability of known BIST circuits to test transceivers under normal operating conditions, the known prior art designs suffer from the following problems. First, as the data transmission speeds become faster and faster, the protocols associated with the standards governing the transmission of data are becoming exceedingly complex. Accordingly, it is often necessary to be able to vary the input test data in order to allow for a complete test to be performed on the device. Moreover, it may be necessary to vary the input test data during the testing process in order to isolate and identify a given component failure. Known BIST circuits do not provide any means for controlling and/or varying the input data during the testing process.

Furthermore, known BIST circuits do not allow for separate control of the transmitter section and the receiver section during the self-test process. For example, as shown in the '829 patent, selection of the self-test mode automatically controls both the transmitter section and the receiver section to the self-test mode of operation. However, as explained in more detail below, it is sometimes necessary to isolate the operation of the transmitter section and the receiver section during self-test operations so as to allow for detection of errors in, for example, the transmitter section.

Accordingly, there is exists a need for a built-in self-test (BIST) circuit which allows for external data to be input as the test data during the testing sequence, and which allows for isolation of the transmitter section and receiver section during the self-test operation.

SUMMARY OF THE INVENTION

In an effort to solve the aforementioned needs, it is an object of the present invention to provide a BIST circuit which allows for external data to be input during the self-test operation, and which allows for isolation of the transmitter section and receiver section during the self-test operation.

More specifically, the present invention relates to a data transceiver capable of transmitting and receiving data. The data transceiver comprises a self-test data generator for generating test data, which includes a first pseudo-random number generator capable of generating a digital word. The first pseudo-random number generator is also programmable so as to allow the operator to input test data values during testing. The data transceiver also includes a transmitter section coupled to the self-test data generator, which is operable for receiving the test data and processing the test data in the same manner as any other data to be transmitted by the transmitter section. The data transceiver also includes a receiver section coupled to the transmitter section, which is operable for receiving the test data output by the transmitter section and for processing the test data in the same manner as any other data to be received by the receiver section. Finally, the data transceiver also comprises a test data analyzer coupled to the receiver. The test data analyzer is operative for verifying the accuracy of the test data output by the receiver, and outputting an error signal if there is an error in the test data. In one embodiment, the test data analyzer includes a second pseudo-random number generator capable of generating a digital word. Similar to the pseudo-random generator contained in the self-test data generator, the second pseudo-random number generator is also programmable so as to allow the operator to input the data values via a data bus coupled to the test data analyzer. Both the self-test data generator and the test data analyzer are independently controllable.

As described in further detail below, the present invention provides significant advantages over the prior art. Most importantly, the BIST circuit of the present invention allows for external data to be input into the BIST circuit so as to allow for variations in the data to be utilized during self-test operations. This allows for the test data to be utilized by the BIST circuit to be updated as necessary to fully test all protocols of a given standard. Moreover, as new transmission protocols are developed, the data sequences necessary to test such protocols can simply be input into the BIST circuit so as to allow for testing of the new protocols.

In addition, by providing separate control of both the self-test data generator and the test data analyzer of the data transceiver during self-test, the present invention can detect errors, for example, in the transmitter section that would otherwise be undetectable.

Moreover, as explained in further detail below, by allowing separate control of the self-test data generator and the test data analyzer, a transceiver implementing the USB standard can be easily tested without requiring the use of a host computer. Thus, the present invention also functions to facilitate and simplify the overall testing process of the transceiver.

Additional advantages of the present invention will become apparent to those skilled in the art from the following detailed description of exemplary embodiments of the present invention.

The invention itself, together with further objects and advantages, can be better understood by reference to the following detailed description and the accompanying drawings.

DETAILED DESCRIPTION OF THE INVENTION

Figure 1:
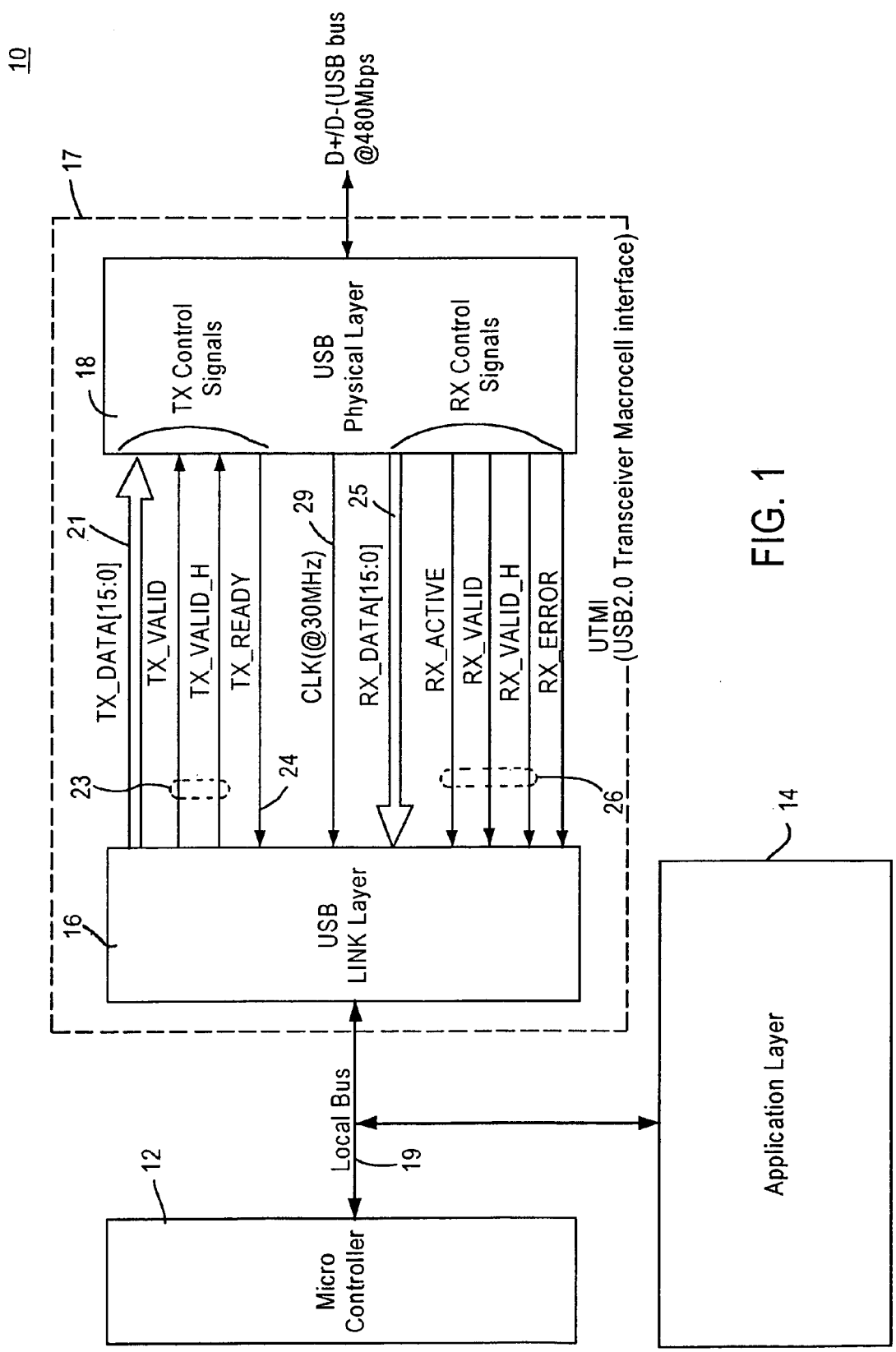
FIG. 1 illustrates an exemplary block diagram of a peripheral device incorporating a USB serial interface.

FIG. 1 illustrates an exemplary block diagram of a peripheral device 10 incorporating a USB serial interface. As shown, the device 10 comprises a microcontroller 12, an application layer 14, a USB link layer 16 and a USB physical layer 18. The microcontroller 12, the application layer 14 and the USB link layer 16 are coupled to one another via a local bus 19. The USB link layer 16 and the USB physical layer 18 are coupled together via signal lines, which are described in detail below.

In general, the operation of the device 10 is as follows. The microcontroller 12 functions to control the overall operation of the peripheral device 10, including when data will be transmitted by the device 10 via the USB interface 17, which is formed by the USB link layer 16 and the USB physical layer 18. The application layer 14 contains the software associated with the given peripheral device (e.g., CCD camera), which is utilized to program the microcontroller 12. The microcontroller 12 accesses the application layer 14 via the local bus 19.

Data to be transmitted or received by the peripheral device 10 traverses the USB interface 17. More specifically, data to be transmitted is first provided by the microcontroller 12 to the USB link layer 16, which operates at a lower clock rate (e.g., 30 MHz) as compared to the output data rate of the USB physical layer 18. The USB link layer 16 functions to provide data to be transmitted in a parallel format (e.g., 16 bit word) to the USB physical layer 18 via a data bus 21. The USB link layer 16 also provides transmit control signals 23 to the USB physical layer 18, which function as trigger signals indicating that the data transferred is valid and can be transmitted by the USB physical layer 18. In response to receipt of the transmit control signals 23, the USB physical layer 18 generates a transmit ready signal 24 and forwards the signal to the USB link layer. The transmit ready signal 24 functions as a handshake signal confirming that the transmit control signals 23 were received by the USB physical layer 18. Upon receipt of the data and transmit control signals 23, the USB physical layer 18 functions to convert the parallel data received from the USB link layer 16 into a serial format, and outputs the serial data at a high data rate (e.g., 480 Mb/sec.).

Both the USB link layer 16 and the USB physical layer 18 also comprise a receiver section for receiving incoming data. Incoming serial data is received by the USB physical layer 18. The USB physical layer 18 converts the data to a parallel format and transmits the data to the USB link layer 16 via a data bus 25. The receiver section of the USB physical layer 18 also generates receiver control signals 26 which are coupled to the USB link layer 16. The receiver control signals 26 operate to inform the USB link layer 16 that the received data is valid and is ready for transfer to the USB link layer 16. The USB physical layer 18 also generates a BIST-ERR signal, which as explained in detail below, indicates when an error has occurred during performance of the BIST. In the embodiment shown in FIG. 1, the USB physical layer 18 also provides a clock signal 29 (e.g., 30 MHz) to the USB link layer 16. The clock signal utilized by the USB physical layer 18 is generated within the USB physical layer 18. It is noted that the components for forming a standard USB link layer 16, which is the type utilized in the present invention, are well known by those of skill in the art.

Figure 2:
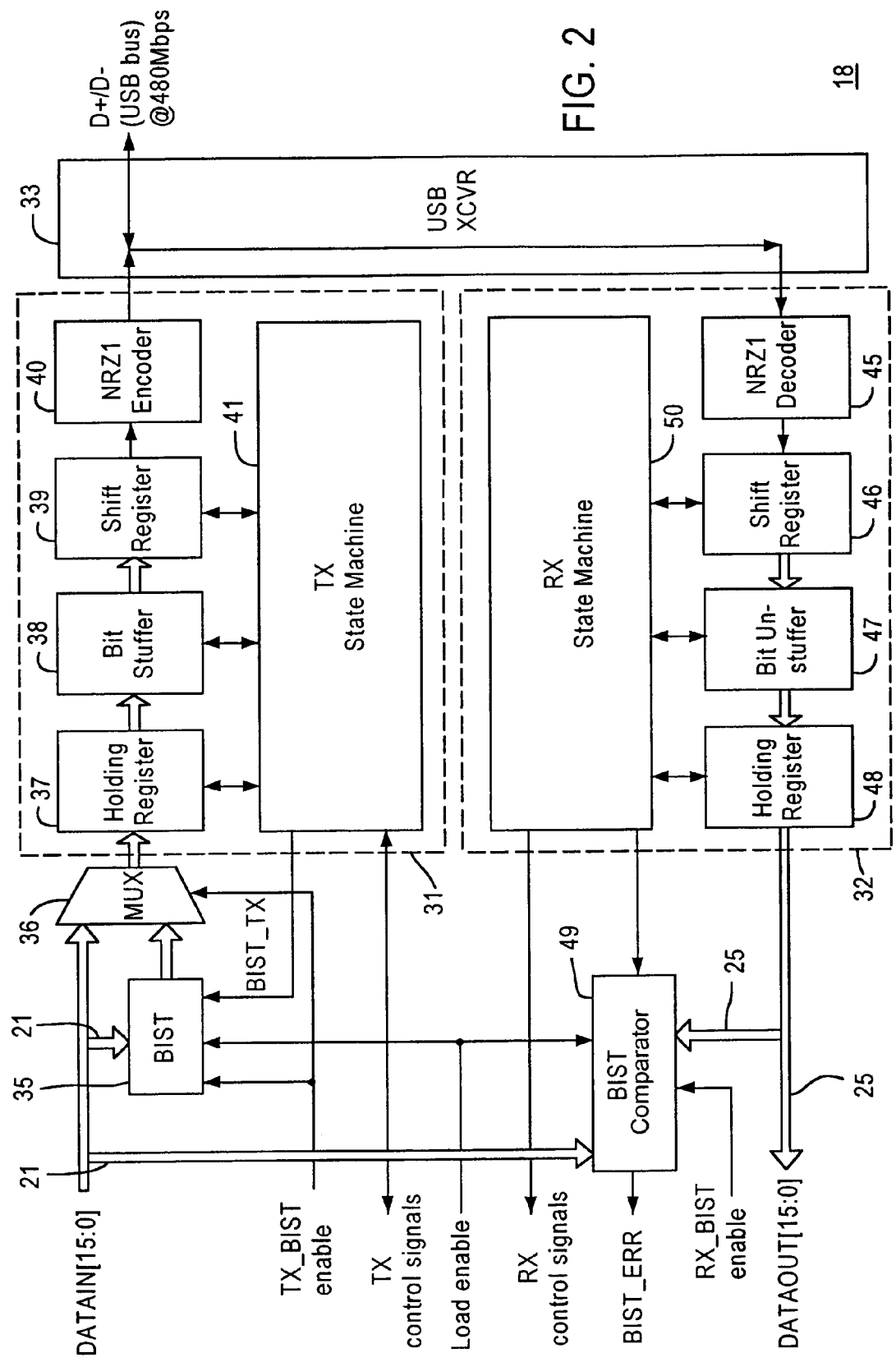
FIG. 2 illustrates an exemplary block diagram of a physical layer of the USB interface incorporating the present invention.

FIG. 2 illustrates an exemplary block diagram of a physical layer of the USB interface incorporating the present invention. As shown, the USB physical layer 18 comprises a built-in self-test circuit (TX-BIST) circuit 35, a multiplexer 36, a transmitter section 31, a receiver section 32, a built-in self test analyzer circuit 49 and a transceiver 33. The transmitter section 31 comprises a holding register 37, a bit stuffer circuit 38, a shift register 39, a non-return-to-zero inverted (NRZI) encoder 40, and a transmitter state machine 41. The receiver section 32 comprises a NRZI decoder 45, a shift register 46, a bit unstuffer 47, a holding register 48 and a receiver state machine 50.

The operation of the USB physical layer 18 is as follows. In the normal mode of operation (i.e., non-self test mode), data is received over the data bus 21. As the TX-BIST enable signal is inactive during the normal mode of operation, the multiplexer 36 is controlled via the TX-BIST enable signal to select the data bus 21 as an input. As such, the data on data bus 21 is output by the multiplexer 36 and input into the holding register 37, which is a buffer having a length sufficient to accommodate the size of the data word. In the current embodiment, as the data word is 16 bits wide, the buffer contained in the holding register 37 would also be 16 bits wide. The output of the holding register 37, which in the current example is a 16 bit data word, is coupled to the input of the bit stuffer circuit 38. The bit stuffer circuit 38 functions to implement a bit stuffing protocol, which inserts a "0" bit (i.e., stuffed bit) in the event there are more than six consecutive "1"s in the data word. The bit stuffing requirement complies with the requirements of the USB 2.0 standard, and the circuitry for implementing the protocol is well known. The output of the bit stuffer circuit 38, which is also a 16 bit data word, is coupled to the input of the shift register 39. The shift register 39 functions to convert the parallel data received from the bit stuffer circuit 38 into a serial data stream. In the current example, the rate of the data output by the shift register 39 is 480 Mb/sec. The output of the shift register 39 is coupled to the input of the NRZI encoder 40. The NRZI encoder 40 functions to implement the non-return to zero protocol in order to facilitate the transmission of data. The NRZI encoding scheme is also a protocol of the USB 2.0 standard, and the circuit for implementing the encoding scheme is well known. The output of the NRZI encoder 40 is coupled to the input of the transceiver circuit 33. The transceiver 33 functions to transmit the serial data output by NRZI encoder 40 onto the USB bus (not shown). It is noted that the transmitter state machine 41 is a logic circuit designed to control the operation and timing of the foregoing components of the transmitter section 31. The implementation of the transmitter state machine 41 is well known to those of skill in the art.

Turning to the receiver section 33, during the normal mode of operation, the transceiver 33 functions to couple the incoming serial data to the input of the NRZI decoder 45, which functions to decode the incoming data and return the data to the traditional "0" and "1" data format. The output of the NRZI decoder 45 is coupled to the input of the shift register 46, which functions to convert the serial data received as an input signal into parallel data. In the current example, the output of the shift register 46 is a 16 bit data word. The output of the shift register 46 is coupled to the bit unstuffer circuit 47, which functions to remove any "stuffed" bits inserted into the data stream prior to transmission. The output of the bit unstuffer circuit 47 is coupled to the input of the holding register 48, which in the current embodiment is a 16 bit register. The output of the holding register 48 is coupled to data bus 25. Similar to the transmitter state machine 41, the receiver state machine 50 is a logic circuit designed to control the operation and timing of the foregoing components of the receiver section 33. The implementation of the receiver state machine 50 is well known to those of skill in the art. Further, as with the bit stuffer circuit 38 and the NRZI encoder 40, the circuits for implementing the bit unstuffer circuit 47 and the NRZI decoder 45 are well known.

It is further noted that receiver state machine 50 functions to generate the receiver control signals 26 discussed in more detail below, which function to notify the USB link layer 16 that the data on bus 25 is valid and ready for retrieval.

Figure 3:
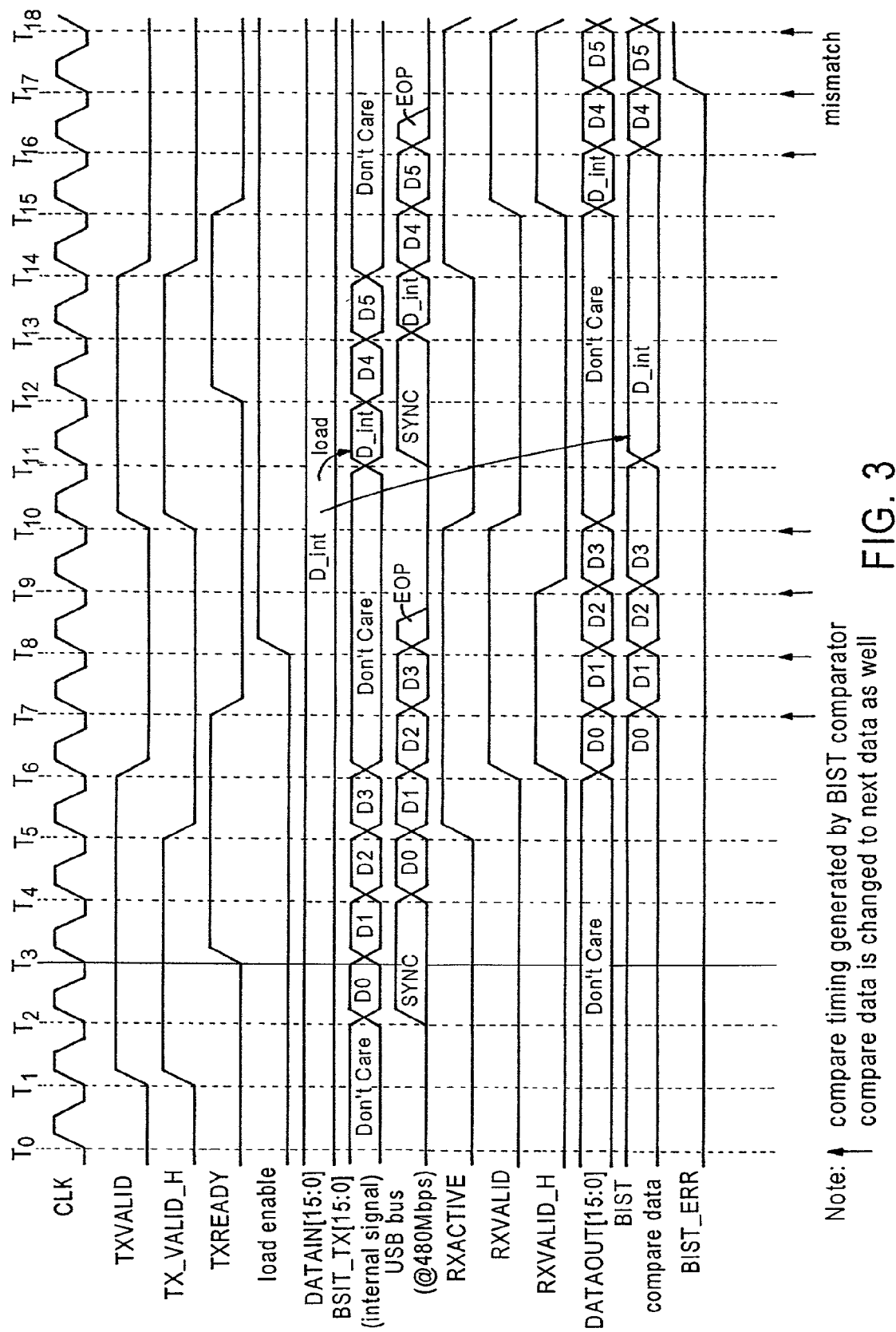
FIG. 3 is an exemplary timing diagram illustrating the operation of the present invention.

The operation of the USB physical layer 18 in the BIST mode is now described in conjunction with the exemplary timing diagram illustrated in FIG. 3. The BIST mode is selected by making the TX-BIST enable signal active. It is noted that the circuit responsible for generating the TX-BIST enable can vary depending upon the implementation. For example, it can be generated by the link layer 16. However, alternatively, if the physical layer 18 is isolated from the link layer, all control signals necessary for operating in the BIST mode can be generated by the physical layer 18. When TX-BIST enable signal is active, the TX-BIST circuit 35 is made active and the multiplexer 36 is commanded to select the data bus coupled to the output of the TX-BIST circuit 35. When active, the TX-BIST circuit 35 functions to generate a series of pseudo random data words, which are output by the TX-BIST circuit 35 and coupled to the holding register 37 via the multiplexer 36.

Circuits for generating such pseudo random test data are well known in the art. For example, one such circuit comprises a shift register having the desired word width, where the output of the two most significant bits are coupled to the inputs of an exclusive NOR gate, the output of which is coupled to the input of the shift register. As such, pseudo random data words are generated by simply clocking the shift register. Of course, numerous other techniques can be utilized to generate the pseudo random data output by the TX-BIST circuit 35.

Figure 4A:
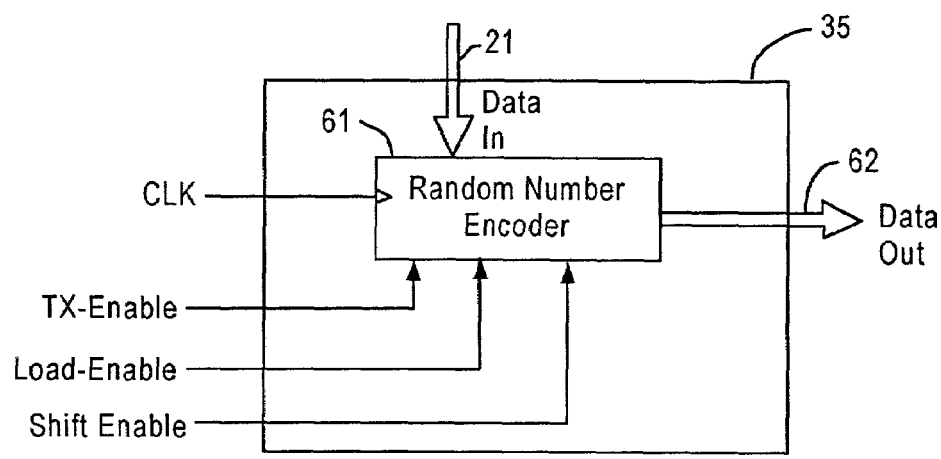
FIGS. 4a and 4b illustrate exemplary block diagrams of one embodiment the self-test generator and the test data analyzer, respectively.

An exemplary block diagram of a TX-BIST circuit 35 is illustrated in FIG. 4a. As shown, the circuit includes a pseudo random number generator circuit 61 having an input port coupled to data bus 21 and a data output port coupled to bus 62 (which is also coupled to the multiplexer 36). The pseudo random number generator circuit 61 receives the following input signals: a TX-ENABLE signal, which when active enables the pseudo random number generator circuit, a LOAD-ENABLE signal which when active functions to command the pseudo random number generator circuit 61 to enter the data value currently on bus 21, and clock signal which functions to provide the timing for the pseudo random number generator circuit 61. In one embodiment, an additional shift-enable signal is provided to pseudo random number generator 61. The shift-enable signal controls the timing for shifting the data of TX-BIST. Specifically, data of the TX-BIST can change to the next data on each positive clock edge when the shift-enable signal is active. The shift-enable signal can be generated by transmitter state machine 41.

The pseudo random test data is clocked out of the TX-BIST circuit 35 and through the transmitter section 31 under control of the transmitter state machine 41. After generation of the test data by the TX-BIST circuit 35, the test data is processed through the transmitter section 31 in exactly the same manner as in the normal mode of operation described above. However, when operating in the self-test mode, upon receipt of the test data by the transceiver 33, the test data is routed to the receiver section 32. It is noted that this routing-back process can be accomplished, for example, by coupling the output of the transmitter to the receiver section (as shown in FIG. 2), and simply turning the receiver off during the normal transmitting operation. Another example is the utilization of an additional multiplexer (not shown) which functions to couple either the external data (i.e., from the external USB bus) or the test data to the receiver section 32. Of course, any other suitable method of performing the routing back of the test data can be utilized.

The test data routed back to the receiver section 32 is then processed by the receiver section 32 in exactly the same manner as normal incoming data. However, in the BIST mode, the BIST analyzer circuit 49 is enabled by activating the RX-BIST enable signal. The input of the BIST analyzer circuit 49 is coupled to the output of the holding register 48 and receives the decoded, unstuffed test data via the bus 25. The BIST analyzer circuit 49 then functions to compare the received test data with the known test data generated by the TX-BIST circuit 35 and generate an error if the expected data is not received. The error signal, BIST-ERR is output by the BIST analyzer circuit 49 and forwarded coupled to the USB link layer 16.

In one embodiment, the BIST analyzer circuit 49 comprises the same pseudo random generator circuit as the TX-BIST circuit 35. In operation, both the TX-BIST circuit 35 and the BIST analyzer circuit 49 are programmed to have the same initial default data value. As explained more detail below, the TX-BIST circuit 35 functions to generate a new test data word each positive clock edge of a reference clock, which in the current embodiment is provided by the transmitter state machine 41. The same clock signal utilized to increment the pseudo random generator of the TX-BIST circuit 35 is also utilized to increment the pseudo random generator of the BIST analyzer circuit 49. The BIST analyzer circuit 49 is controlled so as to generate test data (e.g., D0, D1, D2, D3, etc.) at the same time at which the corresponding test data, previously generated by TX-BIST circuit 35 is present at the output of the holding register 48 and available for comparison. The BIST analyzer circuit 49 receives this test data D0 from the bus 25 and compares the retrieved data to the corresponding data D0 generated internally by the BIST analyzer circuit 49. If the internally generated data value D0 does not match the received test data D0, the BIST analyzer circuit 49 generates the error signal. If the data value matches, upon receipt of the next clock signal, the BIST analyzer circuit 49 generates the next data value, D1 and also retrieves the corresponding test data value D1 which is now present at the holding register 48, and the comparison process is performed again. This process is continued until all of the desired testing is performed.

In the preferred embodiment, the BIST analyzer circuit 49 comprises a comparator capable of comparing the two 16 bit data words. Each clock cycle the comparator functions to compare the data signal generated internally by the pseudo random signal generator and the data signal retrieved from the holding register 48. However, it is noted that there are numerous acceptable variations for implementing the BIST analyzer circuit 49, and the present invention should not be construed so as to be limited to the embodiment disclosed above.

It is further noted that in the present embodiment the RX-VALID and RX-ACTIVE signals must be active so as to allow the BIST analyzer circuit 49 to perform the comparison function necessary to check the test data. These signals are supplied to the BIST analyzer circuit 49 by the receiver state machine 50 and function to control the timing of the comparison process performed by the BIST analyzer circuit 49.

Figure 4B:
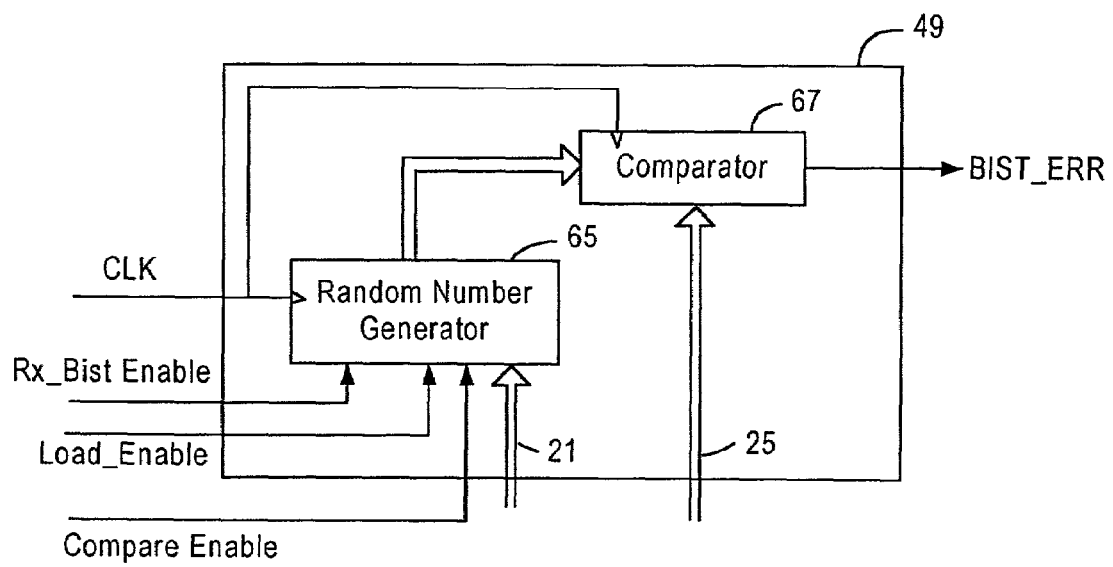

An exemplary block diagram of a BIST analyzer circuit 49 is illustrated in FIG. 4b. As shown, the circuit includes a pseudo random number generator circuit 65 and a comparator 67. The pseudo random number generator circuit 65 has an input port coupled to data bus 21 and a data output port coupled to one input of comparator 67. The pseudo random number generator circuit 65 receives as the following input signals: a RX-ENABLE signal, which when active enables the pseudo random number generator circuit, RX-CONTROL signals (i.e., RX-ACTIVE and RX-VALID) generated by the receiver state machine, a LOAD-ENABLE signal which when active functions to command the pseudo random number generator circuit 65 to enter the data value currently on bus 21, and clock signal which functions to provide the timing for the pseudo random number generator circuit 65. In one embodiment, an additional compare-enable signal is provided to the pseudo random number generator 65. The compare-enable signal controls the timing of the data comparison and the shifting of the data of RX-BIST. DATAOUT data is compared on each positive clock edge when the compare-enable signal is active. Also, the data of RX-BIST changes to next data on each positive clock edge when the compare-enable signal is active. The compare-enable signal can be provided by the receiver state machine 50.

Referring again to FIG. 4b, the comparator 67 comprises two inputs, one which is coupled to the output of the pseudo random number generator 65 and another which is coupled to data bus 25. The comparator 67 also receives as an input signal, the clock signal provided to the pseudo random number generator 65. The output of the comparator 67 represents the error signal. The operation of the BIST analyzer circuit 49 illustrated in FIG. 4b is detailed above.

It is also noted that the TX-BIST circuit 35 and the BIST analyzer circuit 49 are controlled by distinct and separate signals. Referring to FIG. 2, the signals controlling the TX-BIST circuit 35 and the BIST analyzer circuit 49 are TX-BIST enable and RX-BIST enable, respectively. The TX-BIST circuit 35 and the BIST analyzer circuit 49 are active when the corresponding signal is enabled. As a result, it is possible to activate one of the TX-BIST circuit 35 and the BIST analyzer circuit 49 without having to activate the other circuit. As explained in further detail below, by allowing separate control of the TX-BIST circuit 35 and the BIST analyzer circuit 49, the present invention can detect errors, for example, in the transmitter section that would otherwise be undetectable.

Referring again to FIG. 2, when operating in the self-test mode, the present invention also allows for external data to be input into the TX-BIST circuit 35 and the BIST analyzer circuit 49. This allows the data utilized in the testing process to be variable, which can be advantageous when attempting to verify that a given transmission protocol is functioning properly. In other words, by being able to vary the data generated during the self-test process, the present invention provides increased flexibility and capability for verifying that standards and protocols, which can require specific data patterns, are being properly implemented by the transmission device.

More specifically, as shown in FIG. 2, bus 21 is also coupled to the TX-BIST circuit 35 and the BIST analyzer circuit 49 so as to allow an external data word to be input into these circuits. A control signal, referred to as "load enable", is also coupled to both the TX-BIST circuit 35 and the BIST analyzer circuit 49. When the "load enable" signal is enabled, the data word currently on bus 21 is read into both the TX-BIST circuit 35 and the BIST analyzer circuit 49. In the current embodiment, the external data word would be read into the 16 bit shift register contained in each of the TX-BIST circuit 35 and the BIST analyzer circuit 49. Thus, the self-test data generated by the TX-BIST circuit 35 would have an initial value defined by the external data word, and would thereafter have values determined by the implementation of the pseudo-random number generator. Similarly, the BIST analyzer circuit 49 would have an initial value defined by the external data word, and would thereafter have values determined by the implementation of the pseudo-random number generator.

FIG. 3 is an exemplary timing diagram illustrating the operation of the self-test mode of the USB physical layer 18 of FIG. 2. Referring to FIG. 3, the clock signal "CLK" illustrated in the timing diagram represents the 30 MHz clock provided by the USB physical layer 18 to the USB link layer 16. Control signals TX-VALID and TX-VALID-H, which are generated by the USB link layer 16, function as trigger signals instructing the USB physical layer 18 to start the transmission process. As shown in FIG. 3, as both TX-VALID and TX-VALID-H are high at time T1, at the next clock cycle, T2, the TX-BIST circuit 35 begins to generate test data, D0, and the USB physical layer 18 generates a synchronization pattern (which is a USB protocol), which is output by the transmitter section 31. The TX-BIST circuit 35 continues to generate test data (D1, D2, D3, etc.) as long as TX-VALID is active. Upon generation of the sync signal, at the next clock cycle, T3, the transmitter state machine 41 functions to generate a TX-READY signal, which is a handshake signal indicating that data may now be transmitted. It is noted that in the current embodiment, the TX-READY signal is forwarded back to the USB link layer 16. It is also noted that while not shown in FIG. 3, the TX-BIST enable signal is active so as to allow the TX-BIST circuit 35 to generate test data.

Continuing, as the TX-VALID signal and the transmit ready signal are active, at the next clock cycle, T4, data D0 is output by the transmitter section 31 and fed-back to the receiver section 32 of the USB physical layer 18. At the next clock cycle, T5, signal RX-ACTIVE is enabled, thereby activating the receiver section 32. At the next clock cycle, T6, the RX-VALID and RX-VALID-H signals are enabled by the receiver state machine 50 indicating that data is available to be read out from the holding register 48. Accordingly, at time T6, test data D0 is read by the BIST analyzer circuit 49 from the holding register 48 and compared to the internally generated data (which should also be D0 assuming no transmission errors), and an error signal is generated if the data does not match. As stated above, as the BIST analyzer circuit 49 contains the same pseudo random data generator and has the same initial data value, upon receiving the first clock signal (with RX-VALID being enabled) at time T6, the first data value generated by the BIST analyzer circuit 49 should correspond to data D0. Thereafter, upon the receipt of each consecutive clock pulse (while RX-VALID is enabled), the BIST analyzer circuit 49 functions to generate data signals D1, D2, D3, etc., which are compared to the test data signals received from the holding register 48. It is noted that although not shown in FIG. 3, the RX-BIST enable signal is also active so as to allow comparison of the test data by the BIST analyzer circuit 49.

Referring again to FIG. 3, it is shown that the TX-VALID signal goes low at time T6, which results in stopping new data from being generated by the TX-BIST circuit 35. However, each test data word previously generated (i.e., D0-D3) is transmitted to the receiver section 32 and verified by the BIST analyzer circuit 49 in the manner detailed above. Further, upon transmission of the last valid data word, D3, an end-of-packet signal is generated, which subsequently results in the RX-ACTIVE signal being disabled, which results in turning off the receiver section 32 after all transmitted data has been compared.

FIG. 3 also illustrates the timing sequence associated with the operation of the TX-BIST circuit 35 and the BIST analyzer circuit 49 when inputting an initial test value from the external bus 21. Referring to FIG. 3, at time T8, the load enable signal is enabled which results in the data word currently on the data bus 21 being read into both the TX-BIST circuit 35 and the BIST analyzer circuit 49. This initial test value becomes the starting test data, and thereafter the pseudo random generators contained in the TX-BIST circuit 35 and the BIST analyzer circuit 49 generate the additional test data from the externally entered data value. In all other aspects, the generation and testing of data proceeds in the same manner as discussed above.

In the event the BIST analyzer circuit 49 determines there is an error (i.e., the transmitted data does not match the data generated within the BIST analyzer circuit), the BIST analyzer circuit 49 will generate an error signal, BIST-ERR. Referring to FIG. 3, in the example illustrated, it is assumed that at time T16, transmitted data D4 is being compared to the data element D4 generated by the BIST analyzer circuit 49, and that there is an error (i.e., the data words do not match). Accordingly, at time T17, the BIST analyzer circuit 49 generates an error signal.

As described above, the present invention provides significant advantages over the prior art. Most importantly, the BIST circuit of the present invention allows for external data to be input into the BIST circuit so as to allow for variations in the data to be utilized during self-test operation. This allows for the test data utilized by the BIST circuit to be updated as necessary to fully test all protocols of a given standard. For example, by allowing for variations in the test data, it is possible to accurately verify the functionality of the "bit stuffing" circuitry, which is necessary to comply with current USB standards. Moreover, as new transmission protocols are developed, the data sequences necessary to test such protocols can simply be input into the BIST circuit so as to allow for testing of the new protocols.

In addition, by providing separate control of both the TX-BIST circuit and the BIST analyzer circuit of the data transceiver during self-test, the present invention can detect errors, for example, in the transmitter section that would otherwise be undetectable. For example, if both the pseudo random generators in the TX-BIST circuit and the BIST analyzer circuit were malfunctioning and providing the same test data, the self-test would not be properly performed. Yet, this malfunction would go undetected. However, as a result of the present invention, by disabling the TX-BIST enable signal (thereby turning off the TX-BIST circuit 35), data can be input directly into the multiplexer 36 in the self test mode via bus 21. In addition, this same data can be input into the BIST analyzer circuit 49 via bus 21. As a result, the self-test can be performed on the external data input into the multiplexer 36, which is then transmitted by the transmitter section 31 to the receiver section 32 and subsequently verified by the BIST analyzer circuit 49 in the same manner as detailed above. Thus, in the instant example, the TX-BIST circuit 35 is isolated and all other circuits are verified by the self-test.

In addition, by providing separate control of the TX-BIST circuit 35 and the BIST analyzer circuit 49 it is possible to readily provide a data generator circuit (i.e., only the BIST-TX circuit enabled) utilizing the USB physical layer 18.

Furthermore, it becomes increasingly easy to perform the self-test process on devices incorporating the present invention. When testing two chips (e.g., two USB physical layers incorporating the present invention), it is possible to conduct the self test without the need for a host computer or PC to control the processing. More specifically, the first chip is controlled such that only the TX-BIST circuit is activated, so that the first chip functions as a transmitter. The second chip is controlled such that only the BIST analyzer circuit is activated, so that the second chip functions as a receiver. Accordingly, as long as the initial self-test data value is the same in both pseudo random generators contained in the first chip and second chip, upon receipt of the data transmitted by the first chip, the second chip can examine the received data in the same manner as discussed above. The process can then be reversed so as to verify the operation of the transmitter section of the second chip and the receiver section of the first chip. Importantly, as this test requires the use of a cable to interconnect the first and second chip, actual system performance can be verified. And again, this system level performance can be conducted without the need of a host computer or PC. Only the requisite trigger signals discussed above are required to make the USB physical layer operational. Thus, the present invention provides significant advantages to the overall testing/verification process.

It is noted that while the present invention has been described in conjunction with the implementation of a USB standard interface device, it is not limited as such. It is possible to incorporate the self-test apparatus of the present invention into various types of communication interfaces or transceivers, where it is necessary to provide a self-test capability.

Although certain specific embodiments of the present invention have been disclosed, it is noted that the present invention may be embodied in other forms without departing from the spirit or essential characteristics thereof. The present embodiments are therefor to be considered in all respects as illustrative and not restrictive, the scope of the invention being indicated by the appended claims, and all changes that come within the meaning and range of equivalency of the claims are therefore intended to be embraced therein.

I claim:

1. A data transceiver capable of transmitting and receiving data, said data transceiver comprising:
   a self-test data generator for generating test data;
   a transmitter section coupled to said self-test data generator, said transmitter section operable for receiving said test data and processing said test data in the same manner as any other data to be transmitted by said transmitter section;
   a receiver section coupled to said transmitter section, said receiver section operable for receiving said test data output by said transmitter section, and for processing said test data in the same manner as any other data to be received by said receiver section; and
   a test data analyzer coupled to said receiver, said test data analyzer operative for verifying the accuracy of said test data output by said receiver, and outputting an error signal if there is an error in said test data,
   wherein a first signal is input to said self-test data generator and a second signal is input to said test data analyzer so that one of said self-test data generator and said test data analyzer is capable of being activated or deactivated without activating or deactivating the other of said self-test data generator and said test data analyzer.

2. The data transceiver of claim 1, wherein said independent control of said self-test data generator and said test data analyzer allows for one of the self-test data generator and said test data analyzer to be enabled, while the other is disabled.

3. The data transceiver of claim 1, wherein:
   said self-test data generator generates test data in a digital word format having a predetermined number of bits;
   said transmitter section receiving said test data in said digital word format, converting said test data into a serial data format, and transmitting said test data as serial data;
   said receiver section receiving said test data from said transmitter section in said serial format, converting said test data into a digital word format, and outputting said test data as a digital word; and
   said test data analyzer receiving said test data from said receiver section in a digital word format.

4. A data transceiver capable of transmitting and receiving data, said data transceiver comprising:
   a self-test data generator for generating test data;
   a transmitter section coupled to said self-test data generator, said transmitter section operable for receiving said test data and processing said test data in the same manner as any other data to be transmitted by said transmitter section;
   a receiver section coupled to said transmitter section, said receiver section operable for receiving said test data output by said transmitter section, and for processing said test data in the same manner as any other data to be received by said receiver section; and
   a test data analyzer coupled to said receiver, said test data analyzer operative for verifying the accuracy of said test data output by said receiver, and outputting an error signal if there is an error in said test data,
   wherein said self-test data generator and said test data analyzer are independently controllable,
   said self-test data generator generates test data in a digital word format having a predetermined number of bits,
   said transmitter section receiving said test data in said digital word format, converting said test data into a serial data format, and transmitting said test data as serial data,
   said receiver section receiving said test data from said transmitter section in said serial format, converting said test data into a digital word format, and outputting said test data as a digital word,
   said test data analyzer receiving said test data from said receiver section in a digital word format,
   said transmitter section converts said test data from said digital word format to said serial format in accordance with the Universal Serial Bus Standard 2.0, and
   said receiver section converts said serial test data received from said transmitter section to said digital word format in accordance with the Universal Serial Bus Standard 2.0.

5. The data transceiver of claim 1, further comprising a multiplexer coupled to said self-test data generator and said transmitter section, said multiplexer having a first input coupled to an output of said self-test generator via a data bus, a second input coupled to an external data bus, and a first output coupled to an input of said transmitter section, said multiplexer operative for coupling either the output of said self-test data generator or the external bus to said input of said transmitter section.

6. A data transceiver capable of transmitting and receiving data, said data transceiver comprising:
   a self-test data generator for generating test data;
   a transmitter section coupled to said self-test data generator, said transmitter section operable for receiving said test data and processing said test data in the same manner as any other data to be transmitted by said transmitter section;
   a receiver section coupled to said transmitter section, said receiver section operable for receiving said test data output by said transmitter section, and for processing said test data in the same manner as any other data to be received by said receiver section; and
   a test data analyzer coupled to said receiver, said test data analyzer operative for verifying the accuracy of said test data output by said receiver, and outputting an error signal if there is an error in said test data,
   wherein said self-test data generator and said test data analyzer are independently controllable,
   said self-test generator and said test data analyzer comprise the same pseudo-random number generator capable of generating a digital word, and
   said test data analyzer further comprising a comparator operative for comparing said test data received from said receiver section with data generated by said pseudo-number random generator contained in said test data analyzer.

7. The data transceiver of claim 6, wherein said self test generator and said test data analyzer are coupled to an external data bus.

8. The data transceiver of claim 7, wherein said pseudo random number generator contained in said self-test generator and said pseudo random number generator contained in said test data analyzer have programmable data values, said data values being input into both of said pseudo random number generators via said external bus.

9. A data transceiver capable of transmitting and receiving data, said data transceiver comprising:
- a self-test data generator for generating test data, said self-test data generator comprising a first pseudo-random number generator capable of generating a digital word, said first pseudo-random number generator having a programmable data value, said data value being input into said first pseudo random number generator via an external bus coupled to said self-test data generator;
- a transmitter section coupled to said self-test data generator, said transmitter section operable for receiving said test data and processing said test data in the same manner as any other data to be transmitted by said transmitter section;
- a receiver section coupled to said transmitter section, said receiver section operable for receiving said test data output by said transmitter section, and for processing said test data in the same manner as any other data to be received by said receiver section;
- a test data analyzer coupled to said receiver, said test data analyzer operative for verifying the accuracy of said test data output by said receiver, and outputting an error signal if there is an error in said test data, said test data analyzer comprising a second pseudo-random number generator capable of generating a digital word, said second pseudo-random number generator having a programmable data value, said data value being input into said second pseudo random number generator via an external bus coupled to said test data analyzer.

10. The data transceiver of claim 9, wherein said first pseudo random number generator and the second pseudo random number generator are the same.

11. The data transceiver of claim 9, wherein said self-test data generator and said test data analyzer are independently controllable.

12. The data transceiver of claim 11, wherein said independent control of said self-test data generator and said test data analyzer allows for one of the self-test data generator and said test data analyzer to be enabled, while the other is disabled.

13. The data transceiver of claim 9, wherein:
- said self-test data generator generates test data in a digital word format having a predetermined number of bits;
- said transmitter section receiving said test data in said digital word format, converting said test data into a serial data format, and transmitting said test data as serial data;
- said receiver section receiving said test data from said transmitter section in said serial format, converting said test data into a digital word format, and outputting said test data as a digital word; and
- said test data analyzer receiving said test data from said receiver section in a digital word format.

14. The data transceiver of claim 13, wherein said transmitter section converts said test data from said digital word format to said serial format in accordance with the Universal Serial Bus Standard 2.0; and said receiver section converts said serial test data received from said transmitter section to said digital word format in accordance with the Universal Serial Bus Standard 2.0.

15. The data transceiver of claim 9, further comprising a multiplexer coupled to said self-test data generator and said transmitter section, said multiplexer having a first input coupled to an output of said self-test generator via a data bus, a second input coupled to said external data bus, and a first output coupled to an input of said transmitter section, said multiplexer operative for coupling either the output of said self-test data generator or the external bus to said input of said transmitter section.

16. The data transceiver of claim 9, wherein said test data analyzer further comprises a comparator operative for comparing said test data received from said receiver section with data generated by said second pseudo-number random generator contained in said test data analyzer.

17. A data transceiver capable of transmitting and receiving data, said data transceiver comprising:
- a self-test data generator for generating test data, said self-test data generator comprising a first pseudo-random number generator capable of generating a digital word, said first pseudo-random number generator having a programmable initial data value, said data value being input into said first pseudo random number generator via an external bus coupled to said self-test data generator;
- a transmitter section coupled to said self-test data generator, said transmitter section operable for receiving said test data and processing said test data in the same manner as any other data to be transmitted by said transmitter section;
- a receiver section coupled to said transmitter section, said receiver section operable for receiving said test data output by said transmitter section, and for processing said test data in the same manner as any other data to be received by said receiver section;
- a test data analyzer coupled to said receiver, said test data analyzer operative for verifying the accuracy of said test data output by said receiver, and outputting an error signal if there is an error in said test data, said test data analyzer comprising a second pseudo-random number generator capable of generating a digital word, said second pseudo-random number generator having a programmable data value, said data value being input into said second pseudo random number generator via an external bus coupled to said test data analyzer;
- wherein said self-test data generator and said test data analyzer are independently controllable.

18. The data transceiver of claim 17, wherein said independent control of said self-test data generator and said test data analyzer allows for one of the self-test data generator and said test data analyzer to be enabled, while the other is disabled.

19. The data transceiver of claim 17, wherein:
- said transmitter section receives said test data in said digital word format, converts said test data into a serial data format, and transmits said test data as serial data; and
- said receiver section receives said test data from said transmitter section in said serial format, converts said test data into a digital word format, and outputs said test data as a digital word.

20. The data transceiver of claim 19, wherein said transmitter section converts said test data from said digital word format to said serial format in accordance with the Universal Serial Bus Standard 2.0; and said receiver section converts said serial test data received from said transmitter section to said digital word format in accordance with the Universal Serial Bus Standard 2.0.

21. The data transceiver of claim 17, further comprising a multiplexer coupled to said self-test data generator and said transmitter section, said multiplexer having a first input coupled to an output of said self-test generator via a data bus, a second input coupled to said external data bus, and a first output coupled to an input of said transmitter section, said multiplexer operative for coupling either the output of said self-test data generator or the external bus to said input of said transmitter section.

22. The data transceiver of claim 17, wherein said test data analyzer further comprises a comparator operative for comparing said test data received from said receiver section with data generated by said second pseudo-number random generator contained in said test data analyzer.

23. A data transceiver capable of transmitting and receiving data, said data transceiver comprising:

a self-test data generator for generating test data comprising a digital word, said self-test data generator being programmable so as to allow selection of a data value of said test data, said data value being input into said self-test generator via a data bus coupled to said self-test data generator;

a transmitter section coupled to said self-test data generator, said transmitter section operable for receiving said test data and processing said test data in the same manner as any other data to be transmitted by said transmitter section;

a receiver section coupled to said transmitter section, said receiver section operable for receiving said test data output by said transmitter section, and for processing said test data in the same manner as any other data to be received by said receiver section; and a test data analyzer coupled to said receiver, said test data analyzer operative for verifying the accuracy of said test data output by said receiver, and outputting an error signal if there is an error in said test data, said test data analyzer being programmable so as to allow selection of a data value, initial data value being input into said test data analyzer via an external bus coupled to said test data analyzer, wherein a first signal is input to said self-test data generator and a second signal is input to said test data analyzer so that one of said self-test data generator and said test data analyzer is capable of being activated or deactivated without activating or deactivating the other of said self-test data generator and said test data analyzer.

24. The data transceiver of claim 23, wherein said self-test data generator and said test data analyzer are independently controllable.

25. The data transceiver of claim 24, wherein said independent control of said self-test data generator and said test data analyzer allows for one of the self-test data generator and said test data analyzer to be enabled, while the other is disabled.

26. The data transceiver of claim 1, wherein said first signal and said second signal are different enable signals.

27. The data transceiver of claim 23, wherein said first signal and said second signal are different enable signals.

* * * * *